United States Patent

Rakolta et al.

[11] Patent Number: 5,376,929
[45] Date of Patent: Dec. 27, 1994

[54] SELECTIVE CALL RECEIVER WITH BATTERY SAVING FEATURES AND METHOD THEREFOR

[75] Inventors: Pamela A. Rakolta, Cincinnati, Ohio; Osvaldo D. Romero; Kenneth S. Lerner, both of Boynton Beach, Fla.

[73] Assignee: Motorola, Inc., Schaumburg, Ill.

[21] Appl. No.: 982,522

[22] Filed: Nov. 27, 1992

[51] Int. Cl.$^5$ .............................................. H04Q 7/00
[52] U.S. Cl. ............................ 340/825.21; 340/825.44; 455/38.3
[58] Field of Search ................. 340/825.44, 825.21; 455/38.3, 343; 379/57

[56] References Cited

U.S. PATENT DOCUMENTS

| | | | |
|---|---|---|---|
| 4,518,961 | 5/1985 | Davis et al. | 340/825.44 |
| 4,663,623 | 5/1987 | Lax et al. | 340/825.44 |
| 4,756,010 | 6/1988 | Nelson et al. | 375/94 |
| 4,802,240 | 1/1989 | Yamaguchi et al. | 455/343 |
| 4,839,639 | 6/1989 | Sato et al. | 340/825.44 |
| 4,961,073 | 10/1990 | Drapac et al. | 340/825.44 |
| 4,972,439 | 11/1990 | Kuznicki et al. | 375/60 |
| 4,995,099 | 2/1991 | Davis | 455/343 |
| 4,996,526 | 2/1991 | DeLuca | 340/825.44 |
| 5,073,905 | 12/1991 | Dapper et al. | 375/106 |
| 5,077,758 | 12/1991 | DeLuca et al. | 375/95 |
| 5,095,498 | 3/1992 | DeLuca et al. | 375/94 |
| 5,230,084 | 1/1993 | Nguyen | 455/38.3 |
| 5,239,306 | 8/1993 | Siwiak et al. | 340/825.44 |
| 5,274,843 | 12/1993 | Murai et al. | 455/38.3 |

Primary Examiner—Donald J. Yusko
Assistant Examiner—Edward Merz
Attorney, Agent, or Firm—Keith A. Chanroo; John H. Moore

[57] ABSTRACT

A selective call receiver (200) includes a receiver (204) which receives paging signals, the paging signals have a preamble (102), a synchronization codeword (104), and at least an address information (108, 110). A synchronization obtaining circuit (206), coupled to the receiver (204), obtains synchronization to the paging signal. The synchronization obtaining circuit (206) has a preamble detector (404) which detects preamble (102), a synchronization codeword detector (406), responsive to the preamble being detected, detects the synchronization codeword (104), and address decoder (408), responsive to the synchronization codeword being detected, decodes the address information (108, 110). A synchronization maintaining circuit (224, 408) maintains synchronization to the paging signals during the address decoding, and a baud rate detector (224) detects valid and invalid baud rates during address decoding. An initiating circuit (412), responsive to the invalid baud rate being detected, initiates the synchronization codeword detector (406) for detecting at least one subsequent synchronization codeword.

17 Claims, 7 Drawing Sheets

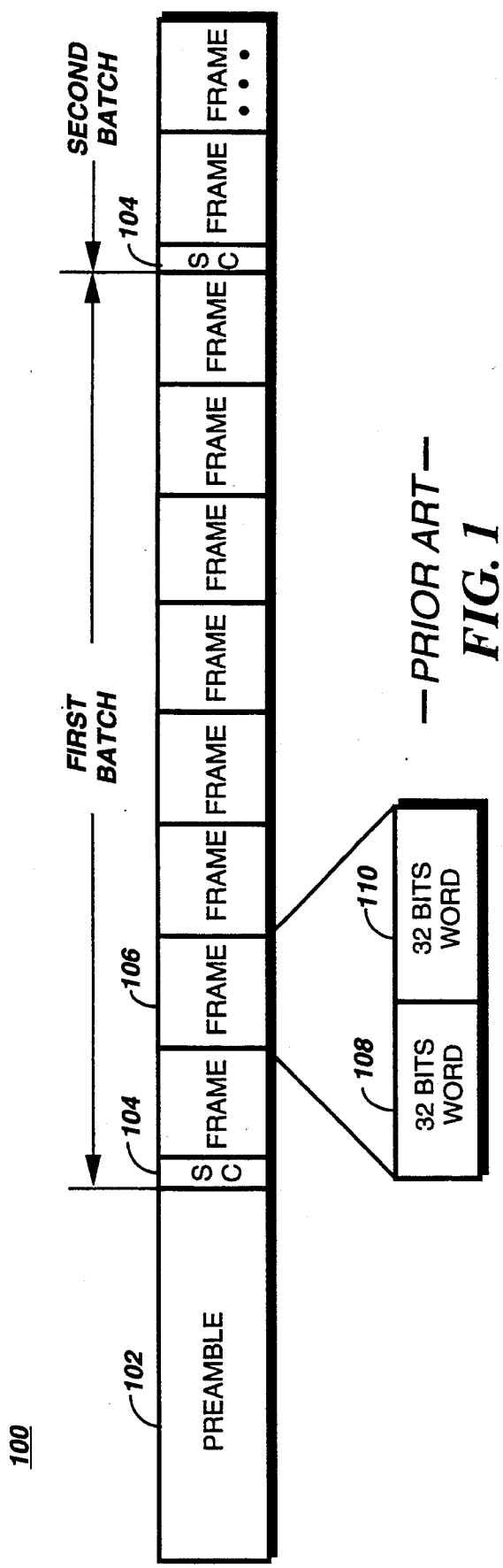
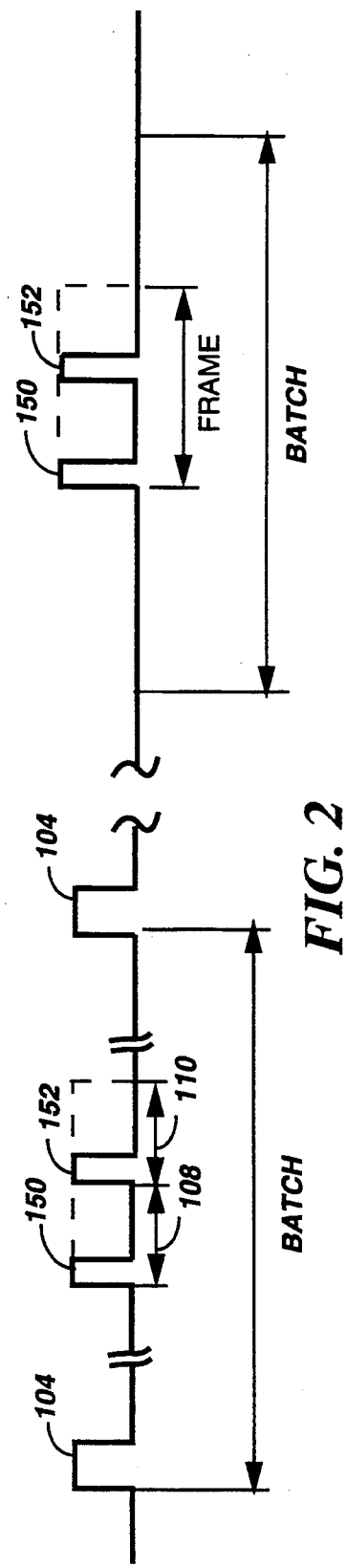

SELECTIVE CALL RECEIVER WITH BATTERY SAVING FEATURES AND METHOD THEREFOR

FIELD OF THE INVENTION

This invention relates in general to selective call receivers and more particularly to selective call receivers with battery saving features and method therefor.

BACKGROUND OF THE INVENTION

With the reduction of the size of selective call receivers and the need for portableness and convenience, selective call receivers now primarily depend upon battery power supplied by limited energy content batteries. Thus, users desire power conserving methods in the selective call receivers to improve battery life. One of the primary current draining circuits in a selective call receiver is the receiver circuitry. The receiver circuitry must necessarily be energized to allow the selective call receiver to receive radio signals intended for reception by the selective call receiver, however, the receiver circuitry can be de-energized during other operations of the selective call receiver.

An example of a conventional power conserving method involves determining whether the carrier frequency indicates transmissions intended for the radio receiver are being received. It can quickly be determined whether a carrier frequency is received, but a radio system may broadcast numerous types of information on the carrier frequency, some of which are not intended for the radio receiver causing the receiver to expend battery power unnecessarily.

Selective call receivers can improve battery life by having the receiver circuitry energized only during portions of the preamble of the signalling protocol received and only during the address portions of selective call messages received to determine if a message is addressed to the selective call receiver. But typical battery saving methods require that the receiver circuitry be energized during the reception of: a sufficient portion of each address received to perform address correlation to determine whether the address is the address of the selective call receiver or not. In addition, typical battery saving methods require that the selective call receiver know when addresses are received within the signalling protocol. For example, conventional battery saving methods can take advantage of the frame assignments and the occurrence of addresses at predetermined positions within the Post Office Code Standardization Advisory Group (POCSAG) signalling protocol. Also, before detection of its address, the selective call receiver must detect the synchronization codeword which enables the selective call receiver to determine word synchronization.

Thus, what is needed is a battery saving method which would conserve power by energizing the receiver circuitry for periods shorter than conventional detection periods for preamble detection, address correlation and synchronization codeword detection.

SUMMARY OF THE INVENTION

A selective call receiver comprises a receiver receiving paging signals, the paging signals includes a preamble, a synchronization codeword, and at least an address information. A means, coupled to the receiver, for obtaining synchronization to the paging signal, the paging signals comprise means for detecting preamble, means, responsive to the preamble being detected, for detecting the synchronization codeword, and means, responsive to the synchronization codeword being detected, for decoding the address information. A means for maintaining synchronization to the paging signals during the address decoding, and a means for detecting valid and invalid baud rates during address decoding. A means, responsive to the invalid baud rate being detected, initiates the synchronization codeword detecting means for detecting at least one subsequent synchronization codeword.

A method for reducing power consumption in selective call receiver which consumes power, the method comprising the steps of:

(a) receiving paging signals comprising a preamble, a synchronization codeword, and at least an address information;

(b) obtaining synchronization to the paging signals wherein the step of obtaining synchronization including the steps of:

(c) detecting the preamble;

(d) detecting at least one synchronization codeword; and (e) decoding the address information;

(f) detecting valid and invalid baud rates of the paging signal;

(g) controlling a supply of power for receiving said paging signals in response to step (f);

(h) maintaining synchronization to the paging signals during address decoding; and (i) initiating step (d) in response to step (f) detecting the invalid baud rate.

BRIEF DESCRIPTION OF THE DRAWINGS

FIG. 1 is a signaling diagram of a prior art POCSAG protocol signal.

FIG. 2 is block diagram illustrating the address detecting scheme in accordance with the preferred embodiment of the present invention.

DESCRIPTION OF A PREFERRED EMBODIMENT

Figure 3:
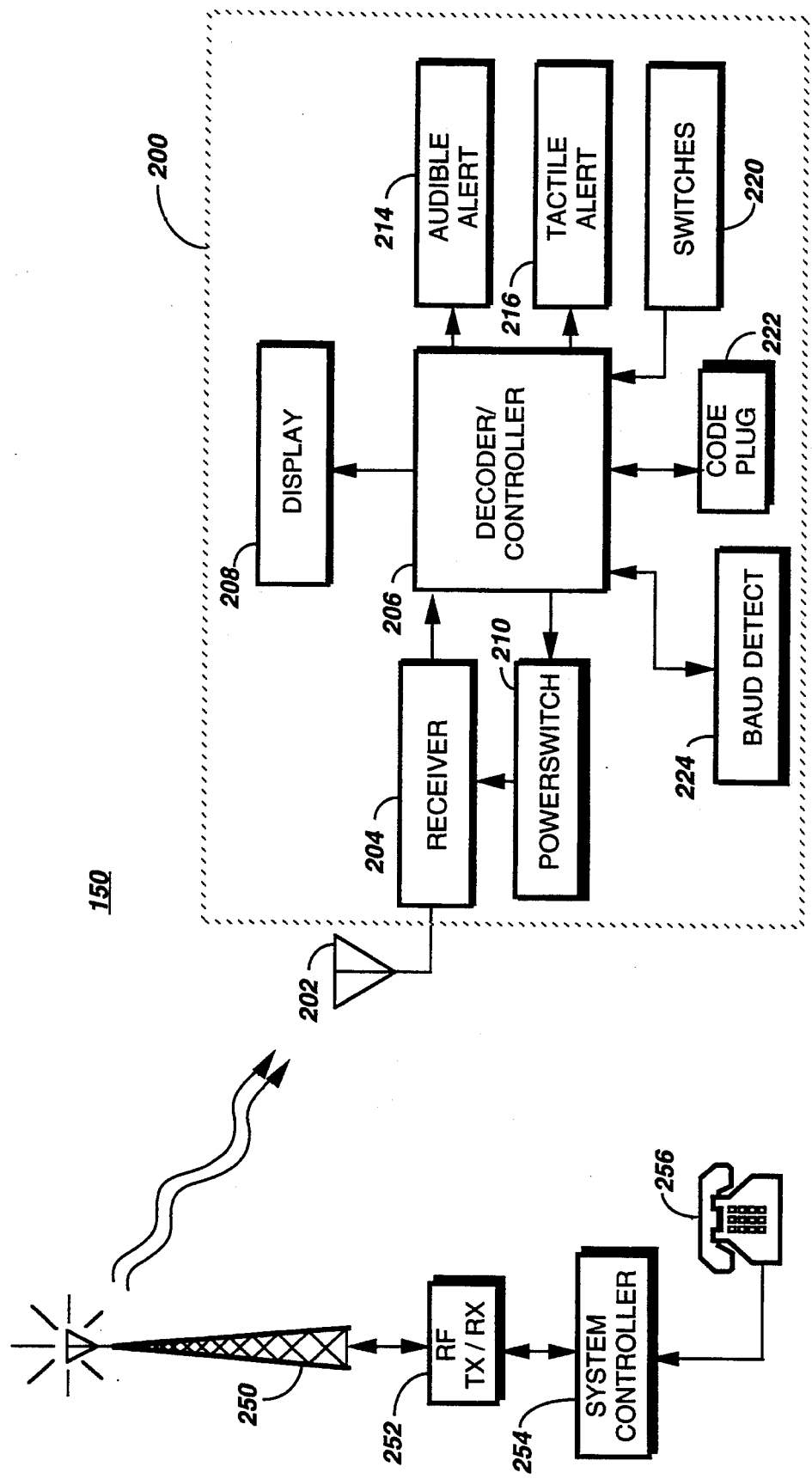
FIG. 3 is an electrical block diagram of a paging system illustrating a paging transmitter and a selective call receiver in accordance with the preferred embodiment of the present information.

Referring to FIG. 1, a signaling diagram of conventional the Post Office Code Standardization Advisory Group (POCSAG) protocol signal which comprises a series of address and/or message information intended for individual or groups of selective call receivers assigned to a paging system. The series of addresses are assembled in accordance with requests and transmitted as a continuous transmission. The transmission is of a digital format and starts with a preamble 102 of at least 576 bits, equivalent to the duration of a batch and one codeword. The preamble 102 is followed by one or more batches of address and message codewords. Each batch begins with a synchronization codeword (SC) 104 followed by eight frames 106, each frame having a duration equivalent to two codewords 108, 110, namely an address codeword and/or a message codeword.

As shown in FIG. 2, the synchronization algorithm in accordance with the present invention requires that the selective call receiver search frame for synchronization word (SC) 104 at least once after the first detection of preamble. However, thereafter, the synchronization codeword 104 need not be decoded with every batch to decode the programmed address words 150, 152, but requires, at a minimum, the detection of the baud rate of the received information while the addresses are being decoded to determine whether the selective call receiver is synchronized to the POCSAG protocol signal or another protocol signal. This is illustrated in the latter portion of FIG. 2 where the drawing shows a first and a second portion of a first and second address 150, 152 which will be discussed further.

FIG. 3 is an electrical block diagram of a paging system 150 illustrating a paging transmitter and a selective call receiver in accordance with the preferred embodiment of the present invention. The paging transmitter is coupled to an input device, for example a telephone 256 for inputting messages or initiating pages via a paging controller 254. The paging controller 254 generates, inter alia, the pages to be transmitted to respective selective call receivers 200 according to the POCSAG signalling protocol. The paging controller 254 is coupled to the radio frequency transmitter/receiver 252 which transmits the pages via the antenna 250. The pages are received by the selective call receiver 200 being addressed. The selective call receiver 200 comprises an antenna 202 for intercepting transmitted radio frequency (RF) signals which are coupled to the input of a receiver 204. The RF signals are preferably selective call (paging) message signals which provide, for example, a receiver address and an associated message, such as numeric or alphanumeric message. However, it will be appreciated that other well known paging signaling formats, such as tone only signaling or tone and voice signaling, would be suitable for use as well. The receiver 204 processes the RF signal and produces at the output a data stream representative of a demodulated data information. The demodulated data information is coupled into the input of a decoder/controller 206 which processes the information in a manner well known in the art. A baud detector 224, coupled to the controller 206, is used to detect the baud rate of the received paging signal. A power switch 210, coupled to the decoder/controller 206, is used to control the supply of power to the receiver 204, thereby providing a battery saving function which will be further discussed in detail below.

For purposes of this illustration, it will be assumed that the POCSAG signaling format is utilized which is well known in the art, although other signaling formats could be utilized as well. When the address is received by the decoder/controller 206, the received address is compared with one or more addresses stored in a code plug (or code memory) 222, and when a match is detected, an alert signal is generated to alert a user that a selective call message, or page, has been received. The alert signal is directed to an audible alerting device 214 for generating an audible alert or to a tactile alerting device 216 for generating a silent vibrating alert. Switches 220 allow the user of the selective call receiver to, among other things, select between the audible alert 214 and the tactile alert 216 in a manner well known in the art.

The message information which is subsequently received is stored in memory 304 (FIG. 4) and can be accessed by the user for display using one or more of the switches 220 which provide such additional functions as reset, read, and delete, etc. Specifically, by the use of appropriate functions provided by the switches 220, the stored message is recovered from memory and processed by the decoder/controller 206 for displaying by a display 208 which enables the user to view the message.

Figure 4:
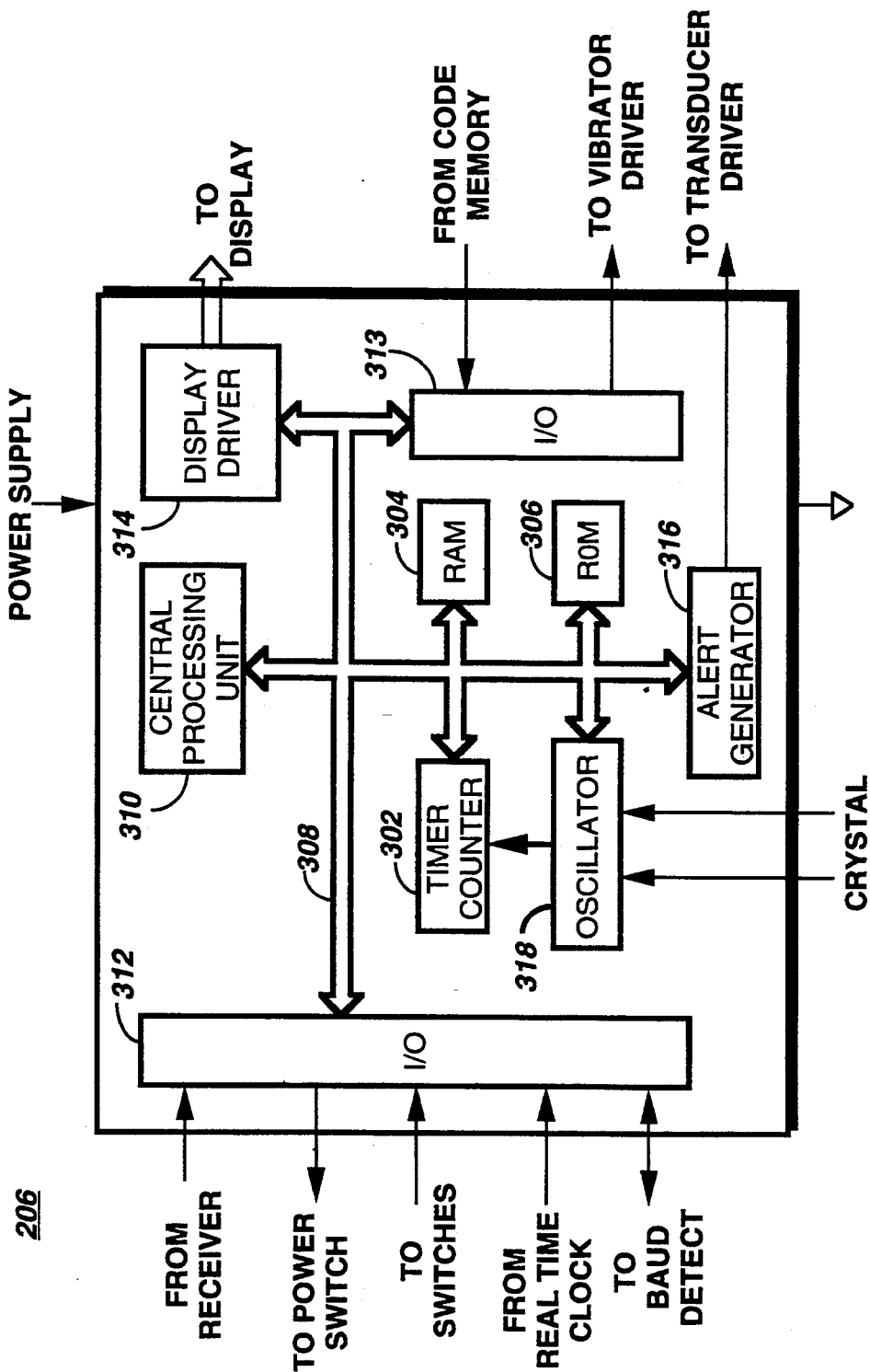
FIG. 4 is an electrical block diagram of the microcomputer used in the selective call receiver of FIG. 3.

The controller/decoder 206 of FIG. 3 can be constructed utilizing a microcomputer as shown in FIG. 4. FIG. 4 is an electrical block diagram of a microcomputer based decoder/controller suitable for use in the selective call receiver of FIG. 3. As shown, the microcomputer 206 is preferably an MC68HC05 microcomputer such as manufactured by Motorola, Inc., which includes an on-board display driver 314. The microcomputer 206 includes an oscillator 318 which generates the timing signals utilized in the operation of the microcomputer 206. A crystal, or crystal oscillator (not shown) is coupled to the inputs of the oscillator 318 to provide a reference signal for establishing the microcomputer timing. A timer/counter 302 couples to the oscillator 318 and provides programmable timing functions which are utilized in controlling the operation of the receiver or the processor. A RAM (random access memory) 304 is utilized to store variables derived during processing, as well as to provide storage of message information which are received during operation as a selective call receiver. A ROM (read only memory) 306 stores the subroutines which control the operation of the receiver or the processor which will be discussed further. It will be appreciated that in many microcomputer implementations, the programmable-ROM (PROM) memory area can be provided by an EEPROM (electrically erasable programmable read only memory). The oscillator 318, timer/counter 302, RAM 304, and ROM 306 are coupled through an address/data/control bus 308 to a central processing unit (CPU) 310 which performs the instructions and controls the operations of the microcomputer 206.

The demodulated data generated by the receiver is coupled into the microcomputer 206 through an input/output (I/O) port 312. The demodulated data is processed by the CPU 310, and when the received address is the same as the code-plug memory which couples into the microcomputer through, for example an I/O port 313, the message, if any, is received and stored in RAM 304. Recovery of the stored message, and selection of the predetermined destination address, is provided by the switches which are coupled to the I/O port 312. The microcomputer 206 then recovers the stored message and directs the information over the data bus 308 to the display driver 314 which processes the information and formats the information for presentation by a display (not shown) such as an LCD (liquid crystal display). At the time a selective call receiver's address is received, the alert signal is generated which can be routed through the data bus 308 to an alert generator 316 that generates the alert enable signal which is coupled to the audible alert device that was described above. Alternatively, when the vibrator alert is selected as described above, the microcomputer generates an alert enable signal which is coupled through data bus 308 to the I/O port 313 to enable generation of a vibratory, or silent alert.

The battery saver operation is controlled by the CPU 310 with battery saving signals which are directed over the data bus 308 to the I/O port 312 which couples to the power switch. Power is periodically supplied to the receiver to enable decoding of the received selective call receiver address signals and any message information which is directed to the receiver or to the transmitter.

Figure 5:
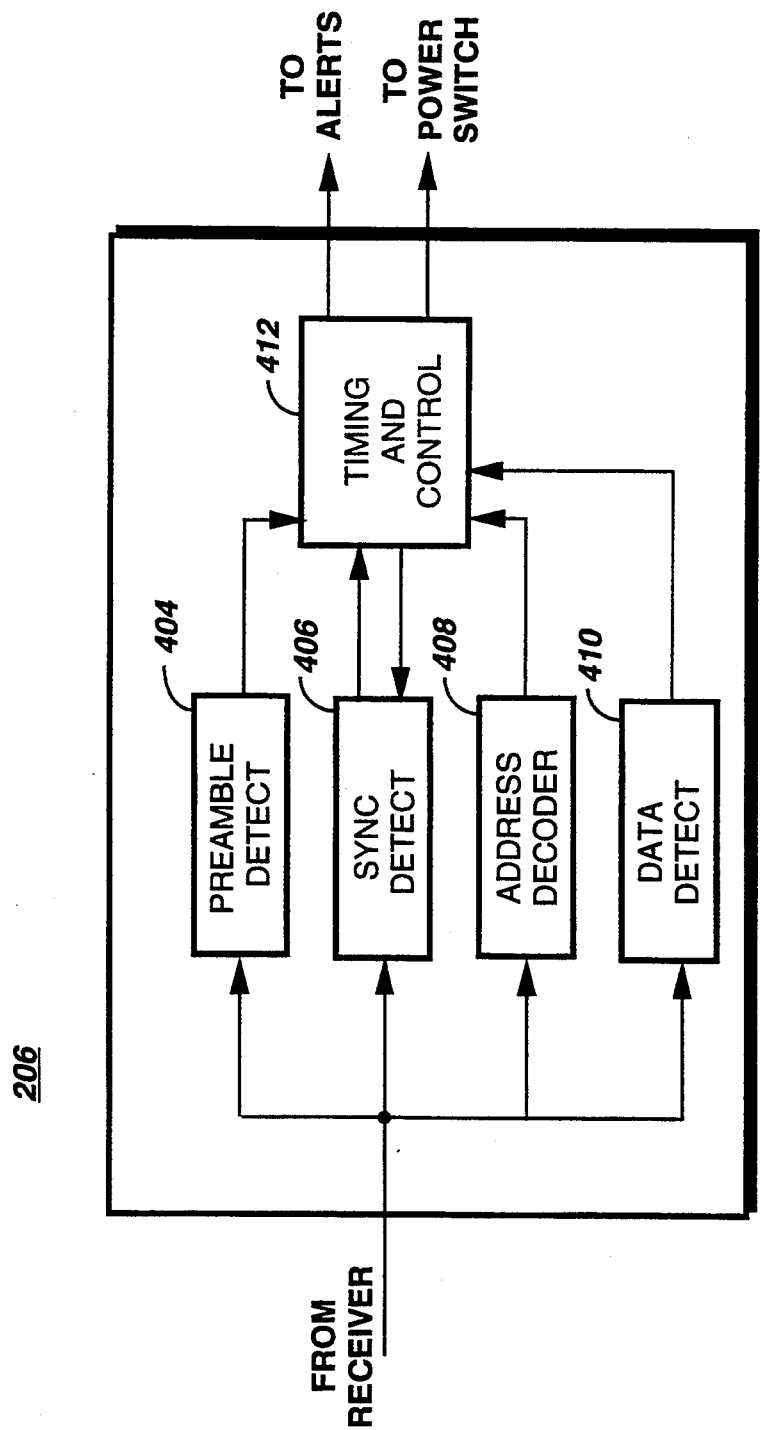
FIG. 5 is an electrical block diagram of the decoding arrangement of the microcomputer shown in FIG. 4.

Referring to FIG. 5, an electrical block diagram of the decoding arrangement of the microcomputer shown in FIG. 4. As discussed above, the ROM stores subroutines for controlling the operations of the selective call receiver. However, those skilled in the art will appreciate that the operations of the selective call receiver may also by controlled by hardware circuitry. According to the preferred embodiment of the present invention, the selective call receiver 200 via the baud detect circuitry 224 (FIG. 3) detects the baud rate of the received signal. When a valid baud rate is detected, the selective call receiver 200 searches the POCSAG signal protocol for preamble by means of a preamble decoder 404 in order to obtain preamble bit synchronization. A synchronization codeword detector (sync detect) 406 searches for the synchronization codeword (SC) to determine word synchronization as is well known to one of ordinary skilled in the art. When preamble and synchronization codeword are detected then the selective call receiver will evaluate its assigned frame to locate its address. Also, when the assigned frame is not the next frame, a timing and control block 412 sends a signal to the power switch which turns-off power to the receiver 204 of the selective call receiver 200 until the assigned frame arrives. In the assigned frame, an address decoder 408 detects at least the first eight bits of the first address word which is correlated to determine when address is located within two bits of error. While the address decoder circuit 408 is decoding address, the baud rate detector (baud detect) 224 (FIG. 3) detects the baud rate of the received signal to determine if the signal is being transmitted is a valid or an invalid baud rate. When the address is found, the timing and control block 412 send a signal to the alert generator 316 (FIG. 4) which generates an alert signal to signify the receipt of a page. Subsequently, a data detector (data detect) 410 detects data, if present, which is stored in memory (not shown) for receipt by the user of the selective call receiver 200.

Figure 6:
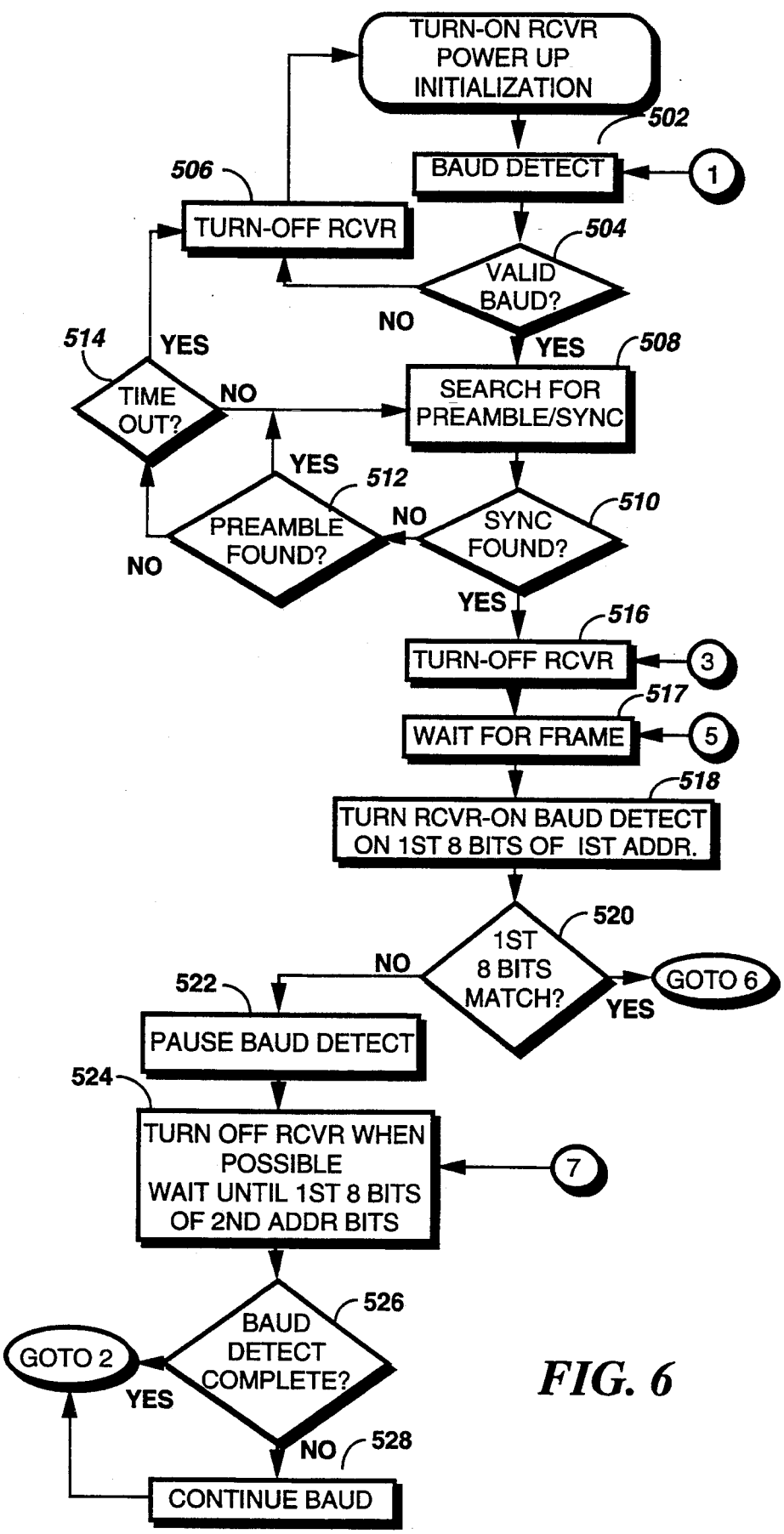
FIG. 6 is a flow diagram illustrating the operation of the selective call receiver of FIG. 3

Referring to the flow diagram of FIG. 6, the preferred operation of the selective call receiver is illustrated. Subsequent to the power-up and initialization block, the baud detect circuitry starts detecting the received information to detect a valid baud rate, step 502. In step 504, the baud rate is checked to determine whether the valid or invalid baud rate was received. When the invalid baud rate is detected, the receiver is turned-off via by the power switch 210, step 506. Alternately, when the valid baud rate has been detected, step 504, the preamble decoder starts decoding the received data for the preamble, and the sync detect begins detecting for the synchronization codeword, step 508. Step 510 detects when the synchronization codeword is being received. If no, step 512 further determines if preamble was actually decoded. If no, a time-out period is checked, step 514, and when the time-out period has expired, the receiver is turned-off, step 506. If the time-out period has not expired, the preamble decoder and the sync detect continue to search for preamble and synchronization codeword, step 508. Alternately, when synchronization codeword is detected, step 510, the receiver turns-off, when possible, step 516, and waits until the arrival of its assigned frame, step 517. The receiver powers-up to receive its assigned frame and the baud detect circuitry begins searching for the valid baud rate on the first eight bits of the first address, step 518.

When the first eight bits of the first address do not match the address stored in codeplug, step 520, baud rate detect is paused, step 522, and the receiver circuitry is turned off until the arrival of the first eight bits of the second address, (i.e., first eight bits of the second codeword of the frame) to continue baud rate detection, step 524. In step 526, the baud rate detection is checked to determine when it is completed, and when completed, the flow continues to FIG. 8. If the baud rate is not completed, step 528 continues the baud rate detection and the flow continues to FIG. 8.

Figure 7:
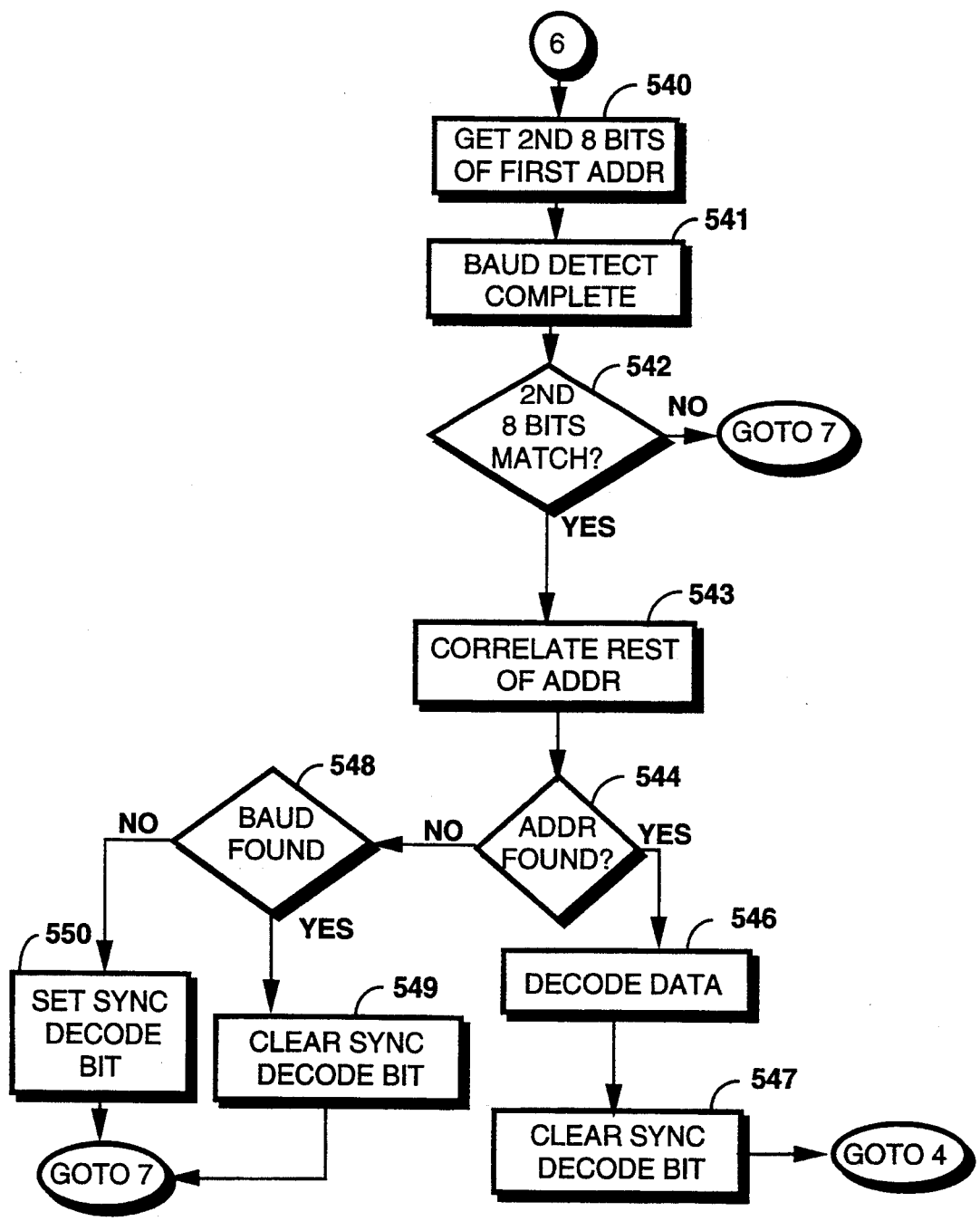
FIG. 7 is a flow diagram illustrating the operation of the selective call receiver of FIG. 3

The flow diagram continues in FIG. 7 which further illustrates the operation of the selective call receiver of FIG. 3. At step 520 (of FIG. 6), when the correlation on the first eight bits of the first address is done, and if the address is found preferably within two bit errors, the next eight bits of the first address portion is retrieved, step 540. The baud detect is completed upon the receipt of the second eight bits of the first address, step 541. The second eight bits of address are checked to determine if the second eight bits match the address stored in the codeplug, step 542. The remainder of the address bits are then correlated to determine if the address is decoded, step 543. Step 544 checks if the address is found. If so, the selective call receiver 200 begins to decode data, if any, which is stored in memory for retrieval by the user of the selective call receiver, step 546. After the data has been decoded, the sync decode bit is cleared, step 547, and the flow continues to step 552 of FIG. 8 where the power to the receiver circuitry is turned-off until the next assigned synchronization codeword. However, if the address was not found, step 544, the baud rate of the signal is checked, step 548. If valid baud rate is detected, the sync decode bit is cleared so that next synchronization codeword is not checked, step 549, and the flow continues to step 524 of FIG. 6. Alternately, when valid baud rate was not detected, step 548, the sync decode bit is set so the sync detect circuitry will search for the next occurrence of the synchronization codeword, step 550 and the flow likewise continues to step 524 of FIG. 6.

Accordingly, the receiver is powered-up to detect the baud rate of the signal, and when the valid baud rate is verified, both the preamble and the synchronization codeword are decoded. When preamble and the synchronization codeword are decoded, the receiver powers down until, when necessary, the arrival of its assigned frame. The address detector detects the first eight bits of the address while the baud rate is being detected simultaneously. If the first eight bits portion of the address are valid, the second eight bits are checked. When both eight bits are valid, the remaining address bits are correlated. The baud rate is detected for the first sixteen bits of the address. If address is verified as valid, the data detect circuitry detects data which is stored in memory and the receiver continues in synchronous mode of operation without needing to detect synchronization codeword for future batches. Therefore, in each assigned frame, the address is decoded simultaneously while the signal baud rate is verified. In this way, battery saving is improved because the receiver can maintain bit and word synchronization on address by decoding the address and verifying the baud rate of the address bits, and therefore the receiver does not need to power-up-to detect the synchronization codeword while the receiver is in the synchronization mode of operation.

Figure 8:
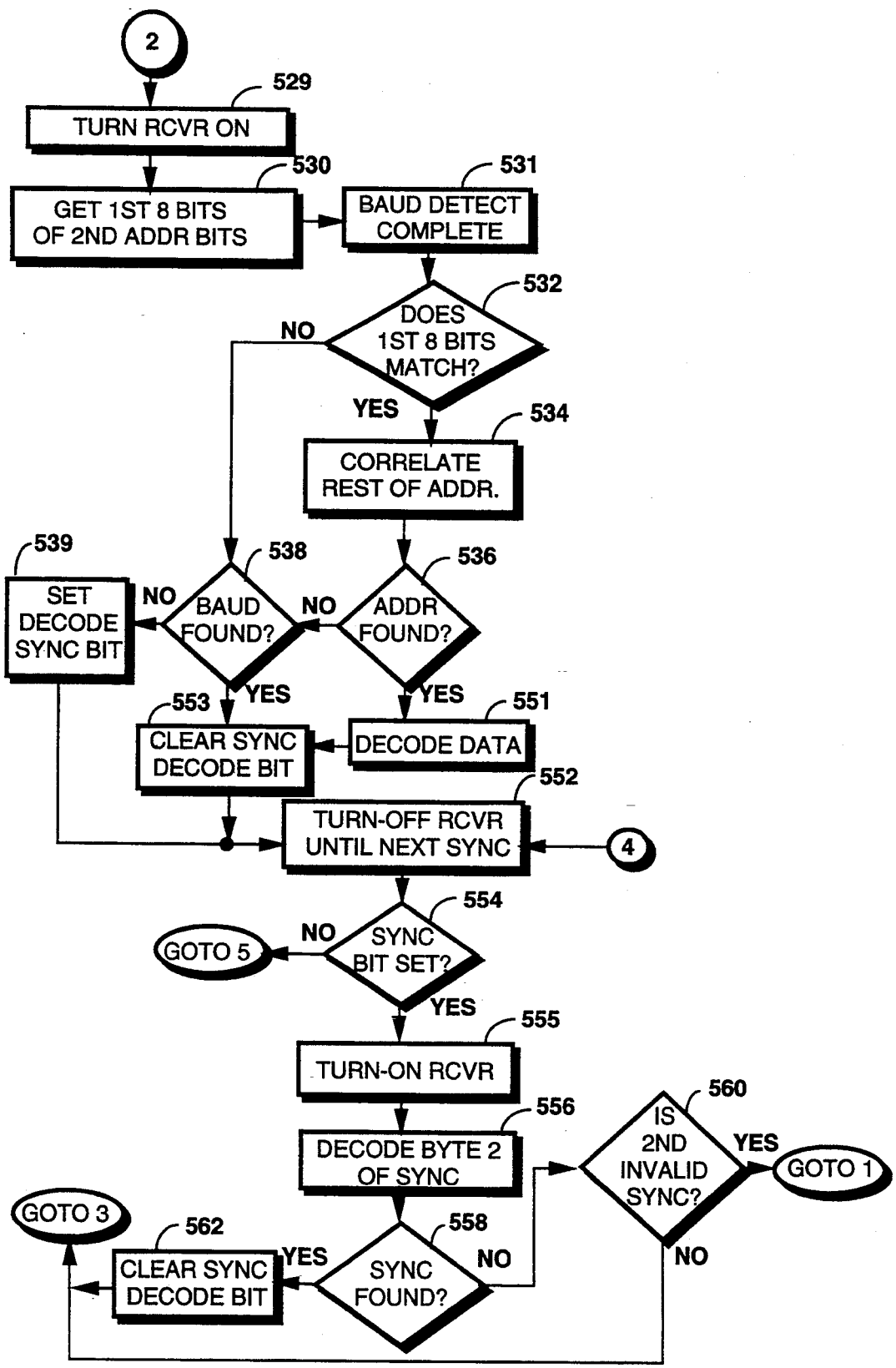
FIG. 8 is a flow diagram illustrating the operation of the selective call receiver of FIG. 3

The flow diagrams continues in FIG. 8 which further illustrates the operation of the selective call receiver of FIG. 3. Continuing from steps 526 and 528 of FIG. 6, the power control switch turns-on the receiver circuitry, step 529, and the controller of the selective call receiver gets the first eight bits of the second address, step 530. Step 531 determines when baud rate detect is completed. The first eight bits of the address is checked to determine if it matches the address stored in memory, step 532. When the eight bits of address is a match, the rest of the address is correlated to determined if address was found, step 534. Step 536 determines if the address matches that which is stored in memory. If no, the baud rate detect checks to determine if valid baud rate is received, step 538. If no, the sync decode bit is set to ensure that the next synchronization codeword is checked, step 539, and the receiver turns off power until the next synchronization codeword, step 552. Alternately, if address was found, step 536, the data decoder begins to decode data, if any, and stores the decoded data in memory. When baud rate is found, step 538 or when after data has been decoded, the sync decode bit is cleared, step 553, and the receiver turns-off until the arrival of the next synchronization codeword, step 552.

The sync decode bit is checked, step 554, and if cleared, the process continues to step 517 of FIG. 6, where the selective call receiver waits until the next frame. Alternately, when the decode sync bit is set to decode, for example when the path continues through step 550 or step 539 the decode sync bit is set, the receiver turns on, step 555. The second eight bits of the synchronization codeword is decoded because byte two of the synchronization codeword has the most number of zero-crossings (or transitions), step 556. Step 558 determines if the synchronization codeword was found, and if so, the sync decode bit is cleared, step 562, and the process continues to step 516 of FIG. 6 as described above. However, if the synchronization codeword was not found, step 558, then step 560 further determines if this is the second invalid synchronization codeword detected, and if so, the process returns to step 502 of FIG. 6, and if it was not the second invalid synchronization codeword found, the process continues to step 516 of FIG. 6 where the power to the receiver circuitry is turned-off until the next frame.

Accordingly, when the receiver fails to locate a valid first eight bits of the address, the first eight bits of the second address are detected to further search for address while performing baud detection. If a valid baud rate and address is found, then the receiver does not check the next occurrence of the synchronization codeword in the next batch. However, when the baud rate is invalid, the receiver checks for the next occurrence of the synchronization codeword in the next batch. Upon finding the synchronization codeword, the receiver will decode the address as in its assigned frame, but when the synchronization codeword is not found, the controller determines if two occurrences of invalid synchronization codewords were received before the receiver returns to asynchronous mode to look again at preamble. In this way, when the first address portion is invalid, the receiver checks the second address portion, and at least one synchronization codeword to enable the receiver to continue decoding its assigned frame. The receiver also double checks to make sure that two synchronization codewords were determined to be invalid before the receiver returns to asynchronous mode of operation, upon the assumption that the receiver has lost synchronization, or that the receiver may be receiving preamble of another transmission. With this operation, the selective call receiver will quickly determine whether it is receiving a valid signal by detecting baud rate on the first sixteen bits of address, and perform battery saving when necessary to conserve battery life. Therefore, battery life can be extended because selective call receiver quickly determine when address is not present in the received signal and is capable of double checking whether the receiver has lost synchronization before it starts to look for another preamble when the invalid baud rate is detected.

In summary, there is provided a selective call receiver comprising means for receiving paging signals including a preamble, a synchronization codeword, and at least an address information. A means, coupled to the receiver means, obtains synchronization to the paging signal which comprises means for detecting preamble, means, responsive to the preamble being detected, for detecting the synchronization codeword, and means, responsive to the synchronization codeword being detected, for decoding the address information. A power control means controls a supply of power to the receiving means, and a means for maintaining synchronization to the paging signals during the address decoding. A means for detecting valid and invalid baud rates during address information detection wherein said baud rate detecting means detects baud rate on a first and second portions of the address information. A means, responsive to the invalid baud rate being detected, initiates the synchronization codeword detecting means for detecting at least one subsequent synchronization codeword. A means, responsive to the synchronization codeword detecting means detecting two invalid codewords, controls reobtaining synchronization wherein the controlling means initiates the synchronization obtaining means.

I claim:
1. A selective call receiver, comprising:
   means for receiving paging signals including a preamble, a synchronization codeword, and at least an address information;
   means, coupled to the receiving means, for obtaining synchronization to the paging signal, comprising:
      means for detecting preamble;
      means, responsive to the preamble being detected, for detecting the synchronization codeword; and
      means, responsive to the synchronization codeword being detected, for decoding the address information;
   means for maintaining synchronization to the paging signals during the address decoding;
   means for detecting valid and invalid baud rates during address decoding; and
   means, responsive to the invalid baud rate being detected, for initiating the synchronization codeword detecting means for detecting at least one subsequent synchronization codeword.

2. The selective call receiver according to claim 1 further comprising a power control means for controlling a supply of power to said receiving means.

3. The selective call receiver according to claim 2 further comprising a disabling means for disabling power to said receiving means when the invalid baud rate is detected.

4. The selective call receiver according to claim 1 wherein the maintaining means, response to said baud rate detecting means detecting the valid baud rate, maintains synchronization during the address decoding.

5. The selective call receiver according to claim 1 wherein the initiating means further comprising:
   means for controlling said baud rate detecting means;
   wherein said controlling means enables said baud rate detecting means for detecting baud rate on at least a portion of the address information while said address decoding means decodes the address information.

6. The selective call receiver according to claim 5 wherein said controlling means, responsive to the invalid baud rate being detected, enables the synchronization codeword detecting means for detecting at least one subsequent synchronization codeword.

7. The selective call receiver according to claim 1 wherein the address decoding means further comprising means for decoding a first portion of a first address and means for decoding a first portion of a second address.

8. A selective call receiver, comprising:
   means for receiving paging signals including a preamble, a synchronization codeword, and at least an address information;
   means, coupled to the receiver means, for obtaining synchronization to the paging signal, comprising:
   means for detecting preamble;
   means, responsive to the preamble being detected, for detecting the synchronization codeword; and
   means, responsive to the synchronization codeword being detected, for decoding the address information;
   power control means for controlling supply of power to said receiving means for enabling the receiving of the paging signals;
   means for maintaining synchronization to the paging signals during the address decoding;
   means for detecting valid and invalid baud rates during address detection;
   means, responsive to the invalid baud rate being detected, for initiating the synchronization codeword detecting means for detecting at least one subsequent synchronization codeword.

9. The selective call receiver according to claim 8 wherein a controlling means for controlling said baud rate detecting means for detecting baud rate on the address information while said address detecting means decodes said address information; and
   said initiating means, responsive to the invalid baud rate being detected, initiating the synchronization codeword detecting means for detecting at least one subsequent synchronization codeword.

10. The selective call receiver according to claim 1 wherein the controlling means controls said baud rate detecting means for detecting baud rates during at least a first portion of a first address and responsive to the valid baud rate being detected on the first portion of the first address, said controlling means controls said baud rate detecting means for detecting baud rate on a second portion of said first address portion.

11. The selective call receiver according to claim 9 wherein the controlling means further controls said power control means for disabling power to said receiving means in response to said baud rate detecting means detecting the invalid baud rate.

12. The selective call receiver according to claim 9 wherein the controlling means, responsive to the synchronization codeword detecting means detecting two invalid synchronization codeword enables asynchronization mode for detecting the preamble.

13. A method for reducing power consumption in selective call receiver which consumes power, the method comprising the steps of:
   (a) receiving paging signals comprising a preamble, a synchronization codeword, and at least an address information;
   (b) obtaining synchronization to the paging signals wherein the step of obtaining synchronization including the steps of:
   (c) detecting the preamble;
   (d) detecting at least one synchronization codeword; and
   (e) decoding the address information;
   (f) detecting valid and invalid baud rates of the paging signal;
   (g) controlling a supply of power for receiving said paging signals in response to step (f);
   (h) maintaining synchronization to the paging signals during address decoding; and
   (i) initiating step (d) in response to step (f) detecting the invalid baud rate.

14. The method according to claim 13 further comprising the step of controlling for controlling step (f) for detecting baud rate during at least a first portion of a first address;
   said controlling step, responsive to the valid baud rate being detected on the first portion of the first address, enables step (f) for detecting baud rate on a second portion of the first address; and
   said controlling step, responsive to the invalid baud rate being detected on the first portion of the first address, enables step (f) for detecting baud rate on a first portion of a second address.

15. The method according to claim 14 wherein said controlling step, responsive to step (d) detecting two invalid synchronization codewords, enables step (b) for reobtaining synchronization.

16. The method according to claim 13 wherein said step of maintaining synchronization, comprising the steps of:
   detecting baud rate on a first portion of the address information; and
   detecting baud rate on a second portion of the address information.

17. A selective call receiver, comprising:
   means for receiving paging signals including a preamble, a synchronization codeword, and at least an address information;
   means, coupled to the receiver means, for obtaining synchronization to the paging signal, comprising:
   means for detecting preamble;
   means, responsive to the preamble being detected, for detecting the synchronization codeword; and
   means, responsive to the synchronization codeword being detected, for decoding the address information;

power control means for controlling supply of power to said receiving means for enabling the receiving of the paging signals;

means for maintaining synchronization to the paging signals during the address decoding;

means for detecting valid and invalid baud rates during address information detection wherein said baud rate detecting means detects baud rate on a first and second portions of the address information;

means, responsive to the invalid baud rate being detected, for initiating the synchronization codeword detecting means for detecting at least one subsequent synchronization codeword; and means, responsive to said synchronization codeword detecting means detecting two invalid codewords, for controlling reobtaining synchronization wherein said controlling means initiates said synchronization obtaining means.

* * * * *

UNITED STATES PATENT AND TRADEMARK OFFICE
CERTIFICATE OF CORRECTION

PATENT NO. : 5,376,929
DATED : December 27, 1994
INVENTOR(S) : Pamela A Rakolta

It is certified that error appears in the above-indentified patent and that said Letters Patent is hereby corrected as shown below:

```
Column 10, line 9, change "codeword" to
    --codewords,--
```

Signed and Sealed this

Fifth Day of December, 1995

Attest:

BRUCE LEHMAN

*Attesting Officer*     *Commissioner of Patents and Trademarks*